(12) United States Patent
Blyth

(10) Patent No.: US 6,521,333 B1
(45) Date of Patent: Feb. 18, 2003

(54) POLYMERIC FILMS

(75) Inventor: Stuart Blyth, Swindon (GB)

(73) Assignee: Hoechst Trespaphan GmbH, Neunkirchen (DE)

( * ) Notice: Subject to any disclaimer, the term of this patent is extended or adjusted under 35 U.S.C. 154(b) by 0 days.

(21) Appl. No.: 09/763,725

(22) PCT Filed: Aug. 26, 1999

(86) PCT No.: PCT/EP99/06273

§ 371 (c)(1), (2), (4) Date: Feb. 27, 2001

(87) PCT Pub. No.: WO00/12305

PCT Pub. Date: Mar. 9, 2000

(30) Foreign Application Priority Data

Aug. 28, 1998 (GB) ............................................... 9818682
Sep. 25, 1998 (GB) ............................................... 9820782

(51) Int. Cl.⁷ ............................. B32B 5/22; B32B 27/32

(52) U.S. Cl. ............................... 428/317.9; 428/318.4; 428/318.6; 428/319.7; 428/319.9; 428/516; 428/910

(58) Field of Search ......................... 428/318.4, 318.6, 428/317.9, 319.7, 319.9, 516, 910

(56) References Cited

U.S. PATENT DOCUMENTS 4,780,364 A    10/1988    Wade et al. ............. 428/315.5

FOREIGN PATENT DOCUMENTS

| EP | 0545649 A | 6/1993 |
| EP | 0545650 A | 6/1993 |

*Primary Examiner*—D. S. Nakarani
(74) *Attorney, Agent, or Firm*—Powell Goldstein Frazer & Murphy LLP

(57) ABSTRACT

Biaxially oriented films having a substantially non-voided pigmented core layer of a propylene homopolymer, an intermediate layer of a voided propylene homopolymer, and two outer layers of a heat sealable olefin polymer. Such films can be heat sealed to form seals with high seal integrity.

7 Claims, No Drawings

POLYMERIC FILMS

This invention concerns polymeric films and more particularly opaque biaxially oriented polypropylene films capable of producing heat seals with good seal integrity.

Opaque biaxially oriented polypropylene films have been proposed hitherto which consist of an opaque core layer consisting of a propylene homopolymer filled with a pigment which does not induce voiding, and outer layers of a non-pigmented heat sealable olefin polymer. In general, such films have a significantly higher opacity than films having core layers consisting of voided polypropylene. However, they also have a number of disadvantages. In particular, the density of such films tends to be high, particularly when compared with voided films, they tend to acquire a crazed appearance when used on vertical form-fill-seal packaging machines, and the integrity of heat seals formed by them can be relatively poor.

According to the present invention there is provided a biaxially oriented film comprising a substantially non-voided pigmented core layer of a propylene homopolymer, an intermediate layer of a voided propylene homopolymer, and two outer layers of a heat sealable olefin polymer.

When viewed from the surface remote from the intermediate layer, films in accordance with the present invention appear substantially the same as films which merely consist of a pigmented but non-voided core layer having a heat seal layer thereon. However, when used on vertical form-fill-seal packaging machines heat seals of high integrity are produced without inducing a crazed appearance. In addition, this can be achieved with a lower density of film.

The core layer is formed from a propylene homopolymer which can contain small amounts of comonomers, for example up to 2 wt % of ethylene, and a pigment which induces substantially no voiding.

The preferred pigment is titanium dioxide as it in general produces white films with a high opacity. The particle size of the pigment is preferably sub-micronic.

The core layer will usually contain up to 30 wt % of a pigment, a preferred range being from 5 to 20 wt % based on the weight of the core layer.

The intermediate layer is of a voided propylene homopolymer. As with the core layer, this polypropylene layer can contain minor amounts of units derived from alkenes other than propylene, for example up to 2 wt % of units derived from ethylene. However, this intermediate layer will include an incompatible substance which induces the formation of microvoids within it when the films are biaxially oriented. The voiding agent can be organic or inorganic, examples of organic voiding agents including polyamides and polyesters, e.g. polymethyl methacrylate, polyethylene terephthalate and polybutylene terephthalate, and examples of inorganic voiding agents include chalk. In general the mean particle size of the voiding agent will be in the range of from 1 to 10 µm.

As will be appreciated by those skilled in the polyolefin film art, the formation of voids within a layer of polypropylene reduces the density of the layer compared with the non-voided starting materials, and in accordance with the present invention the degree of voiding can be varied within wide limits depending on the properties which are required for the films. As will be appreciated, the degree of voiding should be sufficient to inhibit crazing of the core layer when the films are used on vertical form-fill-seal packaging machines and also to impart good seal integrity. In addition, increasing the degree of voiding not only reduces the overall density of the films, in general to densities of less than 0.8 g/cm$^3$ it can enable heat seals formed by them to be peelable by rupture through the thickness of the voided layer. However, very high levels of voiding should in general be avoided since they can weaken the intermediate layer to undesirable levels. Preferably the film has a density of more than 0.8 g/cm$^3$ to prevent crazing.

In general, the amount of voiding agent used for the intermediate layer will be not more than 60 wt % of the weight of the layer, preferred amounts being in the range of from 10 to 40 wt % of the intermediate layer.

In addition to a voiding agent, the intermediate layer can, if desired, include a pigment.

The two outer layers of films of the present invention can be formed from a variety of heat sealable olefin polymers and blends thereof. In general, however, these layers are preferably formed from one or more propylene based copolymer and/or terpolymer which in addition to units derived from propylene contain units derived from at least one of ethylene, butene-1, and higher alpha-olefins. The two outer layers can be of the same or different compositions.

If desired, either or both of the outer layers can include one or more pigments and/or can be voided. In general, at least one of the outer layers will include an antiblock agent, which can be organic, for example particles of a polyamide or a polysiloxane, or inorganic, for example silica or a silicate known in the polymer film art to impart antiblock properties to polyolefin films.

Either or both outer surfaces of films of the present invention can be subjected to a treatment which increases their respective surface energies, for example corona, flame or plasma treatment.

In addition to the four layers referred to above, films in accordance with the present invention can, if desired, include a further intermediate layer on the surface of the core layer opposite to the intermediate layer which has already been referred to. This further intermediate layer can be selected according to the properties which it is desired should be imparted to the films, and it can be selected from a wide variety of polymeric materials. For example, a layer of an unpigmented propylene homopolymer for the purposes of improving the gloss of the films when viewed from that side.

Films in accordance with the present invention can be of a variety of thicknesses. However, the two outer layers will usually have thicknesses of from 0.1 to 8 µm, the preferred thicknesses being in the range of from 0.5 to 1.5 µm. When a further intermediate layer is present, its thickness will usually be selected according to the properties required, for example up to 5 µm thick, and preferably from 0.5 to 2.5 µm, when it is desired to impart improved gloss. The pigmented core layer and the voided intermediate layer together will in general form the major proportion of the thickness of films of the present invention. The relative thicknesses of these two layers can be varied within wide limits according to the properties desired in the resulting films. Increasing the thickness of the core layer will usually result in films with higher opacity whilst increasing the thickness of the voided layer will usually result in films with lower density if the level of pigment and voiding agent within the respective layers is maintained.

The voided intermediate layer will in general form not more than 50% of the overall thickness of films of the present invention, a preferred range being from 10 to 30% of the overall film thickness.

The core layer of films of the present invention will usually have a thickness in the range of from 10 to 100 µm.

Any or all of the layers of films in accordance with the present invention can include one or more additives used in the polypropylene film art, for example slip agents or antistatic agents, in amounts which modify the properties of the films.

Films in accordance with the present invention can be prepared by known methods. However, since they include a voided intermediate layer it is generally preferred to effect sequential biaxial stretching in order to facilitate void formation. It is therefore generally preferred to produce films in accordance with the present invention by coextruding melts of the appropriate polymers through a slot die to produce a multi-layer web which is then stretched first in the direction of extrusion and then the transverse direction. Stretching of the web in the direction of extrusion is preferably effected at a stretch ratio of from 3.5:1 to 7:1, for example by passing it over heated rollers with different peripheral speeds. Stretching in the transverse direction is preferably effected at a stretch ratio of from 5.1 to 12.1, for example using a stenter oven.

The resulting biaxially oriented films are cooled, preferably with an intermediate annealing step, and they can then be subjected to a treatment which increases the surface energy of either or both of their surfaces, for example using corona discharge, flame or plasma treatment.

The following Examples are given by way of illustration only.

Example 1

A five layer polymeric web was produced by extruding through a slot die a core layer of a propylene homopolymer containing 11.4 wt % of titanium dioxide (mean particle size <1 μm), a first intermediate layer on one surface of the core layer consisting of a propylene homopolymer containing 18 wt % of particulate chalk (mean particle size 3 μm), a first outer layer on the first intermediate layer of a heat sealable terpolymer containing a major proportion of units derived from propylene and minor amounts of units derived from ethylene and butene-1, a second intermediate layer on the other surface of the core layer consisting of a propylene homopolymer, and a second outer layer of the heat sealable terpolymer used for the first outer layer.

After cooling, the five layer web was stretched 4.5 times in the direction of extrusion by passing the web over a series of heated rollers with different peripheral speeds, and then 9 times in the transverse direction using a stenter oven at a temperature of 159° C. The resulting biaxially oriented film had a total thickness of 35 μm, the core layer, which was substantially non-voided, being 26 μm thick, the first intermediate layer, which had become voided, was 5 μm thick, the second intermediate layer was 2 μm thick, and the two outer layers were each 1 μm thick. The film had a density of 0.89 g/cm$^3$.

The outer surface of the film formed by the terpolymer layer on the voided second intermediate layer was subjected to corona discharge treatment to increase its surface energy, and then wound up.

When viewed from the side formed by the second heat sealable layer, the film had the appearance of a non-voided opaque film with good gloss, but it had a lower density than might be expected for the degree of opacity.

The film was then used on a vertical form-fill-seal machine with the first heat sealable layer in contact with the forming collar of the machine. The film ran well without producing the crazed effect which is often observed when using non-voided opaque films on vertical form-fill-seal machines.

The heat seals produced between the first heat sealable layer and either itself or the second heat sealable layer had high integrity.

Example 2

A five layered film was produced substantially according to the method described in Example 1 except that the core layer was 30 μm thick, the voided intermediate layer was 3 μm thick and the non-voided intermediate layer was 4 μm thick, the total thickness of the film itself being 39 μm.

The properties of this film are shown in the accompanying Table.

Example 3

A four layer film was produced substantially according to the method described in Example 1 except that the non-voided intermediate layer was omitted. The film had a total thickness of 35 μm with the core layer being 28 μm thick, the voided intermediate layer being 5 μm thick and the two outer layers being 1 μm thick.

The properties of this film are shown in the accompanying Table.

Example 4

A four layer film was produced substantially according to the method described in Example 1 except that the non-voided intermediate layer was omitted and the voided layer contained 10.8. wt % rather than the 18 wt % specified in Example 1. The film had a total thickness of 35 μm with the core layer being 30 μm thick, the voided intermediate layer being 3 μm thick and the two outer layers being 1 μm thick.

The properties of this film are shown in the accompanying Table.

Example 5 Comparison

A three layer film was produced by coextruding a core layer of the composition as that used for the core layer in the preceding Examples, the two outer layers being of the same composition as that of the outer layers of the films of the preceding Examples.

The film had an overall thickness of 35 μm, the core layer being 33 μm and the two outer layers each being 1 μm thick.

The properties of this film are shown in the accompanying Table. As can be seen from the data in the Table, this film had a considerably higher density than that of the other films. However, the films in accordance with the present invention had substantially comparable gloss and optical densities despite the presence of the voided intermediate layer(s).

TABLE

| Example | Film thickness (μm) | Density (g/cm$^3$) | Gloss | Optical density |
| --- | --- | --- | --- | --- |
| 1 | 35 | 0.89 | 51 | 0.58 |
| 2 | 39 | 0.921 | 55 | 0.65 |
| 3 | 36 | 0.894 | 51 | 0.58 |
| 4 | 38 | 0.924 | 52 | 0.60 |
| 5* | 37 | 0.961 | 50 | 0.61 |

*- comparison Example

What is claimed is:
1. An opaque biaxially oriented film for use on vertical form-fill-seal packaging machine for production of a pack without crazing, comprising
   a substantially non-voided core layer of propylene consist of a propylene homopolymer and titanium dioxide;
   at least one intermediate layer of a voided propylene homopolymer; and two outer layers of a heat sealable olefin polymer, wherein the film has density of more than 0.8 g/cm$^3$, the voided intermediate layer or layers in total are from 10 to 30% of the overall film thickness.

2. A film according to claim 1, having a single intermediate layer.

3. A film according to claim 1, having an intermediate layer between the core layer and each of the said outer layers.

4. A film according to claim 1, wherein the heat seal layers comprise the same or different heat sealable polyolefins.

5. A film according to claim 4, wherein the heat sealable polyolefins comprise a copolymer or a terpolymer containing a major amount of units derived from propylene and minor amounts of at least one of ethylene and butene-1, or a blend of such copolymers and terpolymers.

6. A film according to claim 1, wherein the intermediate layer or layers are each up to 5 µm thick.

7. A film according to claim 1, wherein the intermediate layer further contains a pigment.

* * * * *